US010076080B2

(12) United States Patent
Menetrier et al.

(10) Patent No.: US 10,076,080 B2
(45) Date of Patent: Sep. 18, 2018

(54) UNLOADING RAMP FOR A ROUND BALER

(71) Applicant: Deere & Company, Moline, IL (US)

(72) Inventors: Michel Menetrier, Beaujeu (FR);
Didier Delphigue, Dijon (FR); Pascal Gresset, Auxon Dessous (FR)

(73) Assignee: DEERE & COMPANY, Moline, IL (US)

( * ) Notice: Subject to any disclaimer, the term of this patent is extended or adjusted under 35 U.S.C. 154(b) by 85 days.

(21) Appl. No.: 15/181,829

(22) Filed: Jun. 14, 2016

(65) Prior Publication Data

US 2016/0366830 A1  Dec. 22, 2016

(30) Foreign Application Priority Data

Jun. 16, 2015 (DE) ........................ 10 2015 210 999

(51) Int. Cl.
*A01F 15/08* (2006.01)
*A01F 15/07* (2006.01)
*B60P 1/43* (2006.01)

(52) U.S. Cl.
CPC ...... *A01F 15/0883* (2013.01); *A01F 15/0765* (2013.01); *B60P 1/43* (2013.01)

(58) Field of Classification Search
CPC ..... A01F 15/0883; A01F 15/0765; B60P 1/43
USPC .............................................. 100/88, 188 R
See application file for complete search history.

(56) References Cited

U.S. PATENT DOCUMENTS

| 7,578,119 | B2 * | 8/2009 | Viaud | A01F 15/0883 100/88 |
| 8,991,309 | B2 * | 3/2015 | Gresset | A01F 15/0883 100/88 |
| 2004/0020376 | A1 * | 2/2004 | Bentzinger | A01F 15/0883 100/177 |
| 2004/0134177 | A1 * | 7/2004 | Viaud | A01F 15/071 56/341 |
| 2005/0217506 | A1 * | 10/2005 | Meeks | A01D 46/084 100/88 |
| 2006/0278103 | A1 * | 12/2006 | Derscheid | A01F 15/0833 100/88 |
| 2008/0041028 | A1 * | 2/2008 | Viaud | A01F 15/0883 56/341 |
| 2012/0204736 | A1 * | 8/2012 | Blough | B30B 9/3007 100/35 |
| 2014/0026768 | A1 | 1/2014 | Gresset et al. | |
| 2014/0190360 | A1 * | 7/2014 | Gresset | A01F 15/0883 100/88 |

FOREIGN PATENT DOCUMENTS

| DE | 10254954 A1 | 6/2004 |
| EP | 0288600 A1 | 11/1988 |
| EP | 1364574 A1 | 11/2003 |
| EP | 1444882 A2 | 8/2004 |
| EP | 1832157 A1 | 9/2007 |
| EP | 2550854 A1 | 1/2013 |
| EP | 2893799 A1 | 7/2015 |

OTHER PUBLICATIONS

European Search Report in foreign counterpart application No. 16171881.2 dated Oct. 26, 2016 (7 pages).

\* cited by examiner

*Primary Examiner* — Jimmy T Nguyen

(57) ABSTRACT

An unloading ramp for a round baler includes an elongated, flexible carrier that has one end that can be attached or is attached to the round baler and on whose top side there is a rolling surface for a bale ejected from the round baler.

12 Claims, 3 Drawing Sheets

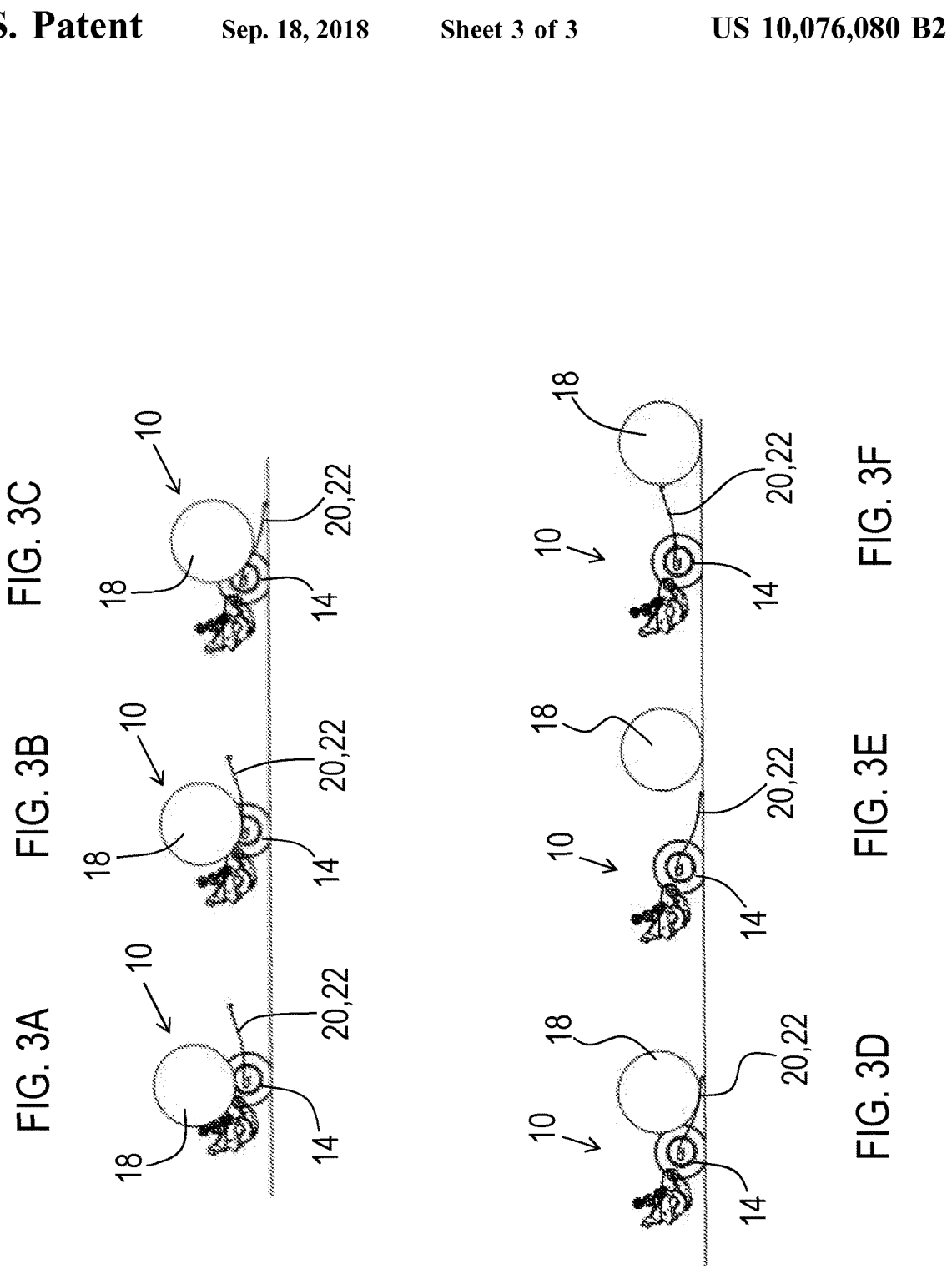

UNLOADING RAMP FOR A ROUND BALER

CROSS-REFERENCE TO RELATED APPLICATIONS

Pursuant to 35 USC § 119, this application claims the benefit of and priority to German patent application no. 102015210999.2, filed on Jun. 16, 2015, which is herein incorporated by reference in its entirety.

FIELD OF THE DISCLOSURE

The invention relates to a round baler with an unloading ramp.

BACKGROUND

Round balers are used to produce bales from stalk-shaped agricultural harvested produce. Such round balers have a bale-forming chamber and associated pressing means. After completion and optional wrapping of a bale with mesh, twine, or film, this bale is ejected out the back of the bale-forming chamber. The bale then rolls on an unloading ramp out of the bale-forming chamber downward onto the ground.

Common unloading ramps include an elongated carrier that is constructed as a welded assembly and is hinged on the housing or chassis of the round baler so that it can pivot about a horizontal axis running perpendicular to the forward direction of the round baler and is pre-tensioned upward by spring force (cf. DE 102 54 954 A1 or EP 0 288 600 A1). If the bale is ejected, the carrier moves downward against the force of the spring. In addition, multiple shock absorbers are provided to damp the vibrations of the unloading ramp when it impacts the ground or after its return into the upper rest position after discharging the bale.

Previous rigid unloading ramps are relatively complicated (expensive) and heavy. There is also the risk that the unloading ramp and optionally other components of the baler could become damaged if the unloading ramp impacts against an obstacle in its rest position, for example, while driving in reverse. Furthermore, the contact surface between a non-cylindrical (barrel-shaped) bale and the unloading ramp is relatively small, which leads to high local contact forces of the bale on the unloading ramp, which can in turn lead to damage to the wrapping material and partial or total breaking apart of the bale. Finally, the case can occur that the rigid unloading ramp contacts the ground only at a few points if the ground is uneven, which leads to stresses in the unloading ramp that can result in material fatigue.

SUMMARY

The present disclosure provides a round baler with an unloading ramp in which the mentioned disadvantages do not occur or occur at a reduced degree.

An unloading ramp for a round baler includes an elongated, flexible carrier that has one end that can be attached or is attached to the round baler and is configured to be used over its length as a rolling surface for a bale ejected from the round baler onto the ground.

In other words, the functions of the previous spring, the previous pivot support, and the previous carrier are combined into one flexible carrier. The flexibility of the carrier makes it possible for this part to partially absorb the energy of the bale while it is rolling, in order to reduce the rotational speed and translational speed of the bale at which it reaches the ground. In this way, a separate spring for pre-tensioning the carrier is eliminated and the unloading ramp can be produced in a relatively lightweight and economical way so that it is insensitive to damage, because it is flexible, and adapts flexibly to non-cylindrical bales and/or uneven ground.

In particular, the carrier can be made from a flexible material. The flexible material could be spring steel, plastic, or rubber. It would also be conceivable, however, that only parts of the carrier are made from flexible material and are arranged between rigid parts of the carrier. Both parts could be macroscopic or microscopic. In both cases, for example, springs made from steel, rubber, etc., could be inserted or embedded between rigid parts made from metal or plastic, etc.

The carrier can have a one-piece construction or can include multiple elements arranged laterally one next to the other.

The flexible material is preferably mounted rigidly on the chassis or on an axle of the baler so that it is pretensioned upward and extends approximately horizontally in the unloaded rest position. When loaded by the bale, the free (rear) end of the carrier reaches the ground.

The (flexible) material of the carrier can have a C shape on the side of the round baler, wherein the lower leg of the C can be connected or is connected to the round baler and the upper leg of the C transitions into the rolling surface. The (flexible) material of the carrier could also have a C shape on the bale output side, wherein the lower leg of the C comes into contact with the ground while unloading the bale and the upper leg of the C transitions into the rolling surface.

BRIEF DESCRIPTION OF THE DRAWINGS

In the drawings, two embodiments of the invention described in more detail below are shown, wherein the reference symbols should not be used to limit the scope of the claims. Shown are:

DETAILED DESCRIPTION

Figure 1:
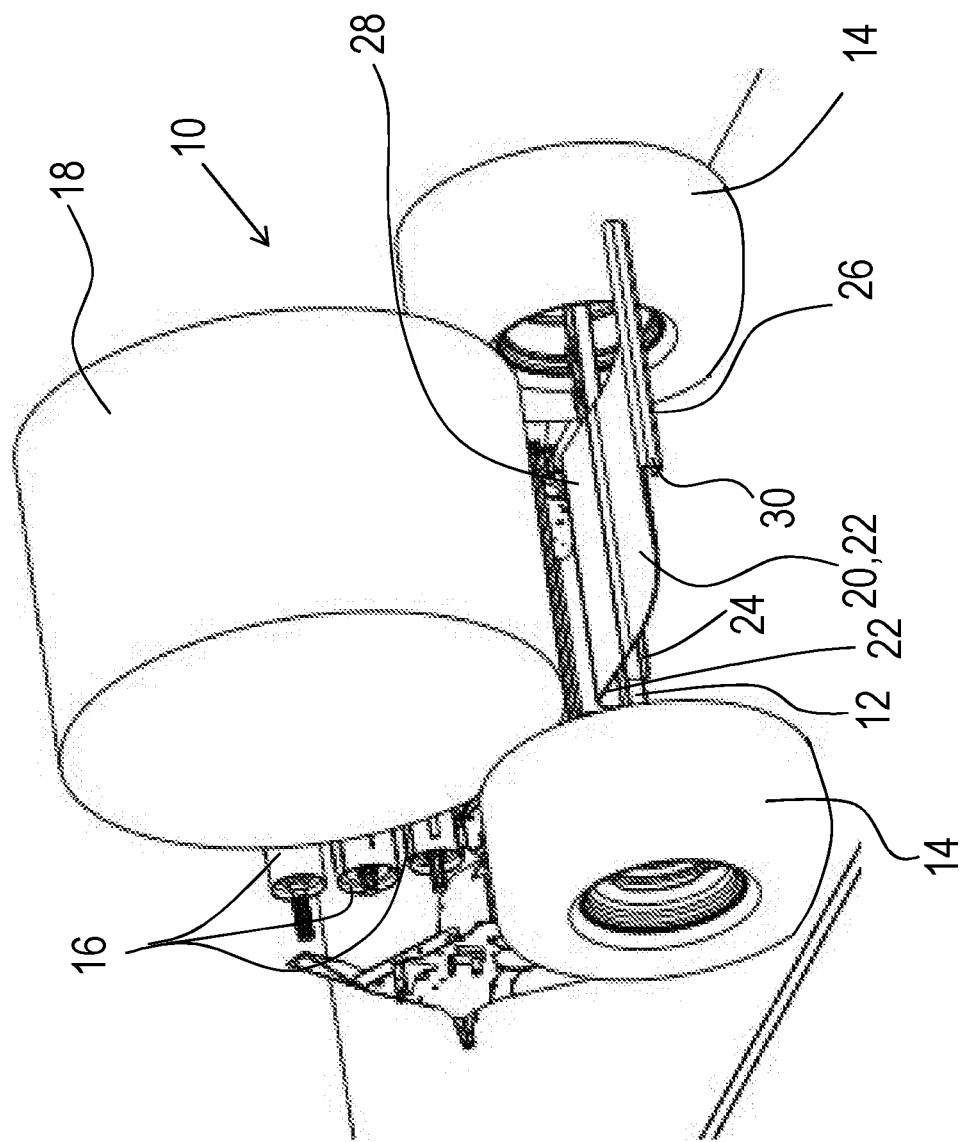
FIG. 1 a schematic rear view of a round baler with a first embodiment of an unloading ramp, FIG. 2 a schematic rear view of a round baler with a second embodiment of an unloading ramp, and FIGS. 3a to 3f lateral views of the round baler with the unloading ramp in different phases while unloading a bale.

FIG. 1 shows a schematic, perspective view of a round baler 10 from behind and from the right. For clarity, some components of the round baler 10 were left out, like a housing, a number of pressing rollers, and a rear door. The round baler 10 includes a chassis with an axle 12 on which wheels 14 are mounted. On the chassis, there is also a number of pressing rollers 16 supported, which enclose a bale-forming chamber. A bale formed in the bale-forming chamber is marked with 18. Such round balers 10 are known, wherein reference is made to the prior art mentioned above. The round baler 10 can have an arbitrary construction, e.g., with a bale-forming chamber of fixed or variable size that can be enclosed by belts or chains or the shown pressing rollers 16. The bale-forming chamber can be closed at the back by a tilting door or can include a pivoting part that carries means for forming a bale in the bale-forming chamber and can move in rotation between a bale-forming position and a bale ejection position (see EP 1 364 574 A1).

An unloading ramp 20 is mounted rigidly (i.e., so that it cannot pivot or the like) on the axle 12 (or a different part of the chassis of the round baler 10), which consists of an elongated carrier 22. The carrier 22 is made from an elastic, flexible material, for example, spring steel. The carrier 22 includes an elongated rolling surface 28 that extends from the axle 12 backward to the rear end of the carrier 22 and on which the bale 18 rolls, after its completion and optional wrapping with twine, film, or mesh, downward onto the ground.

The carrier 22 has a C shape on its front end in the forward direction of the baler 10 whose front moves toward the left in FIG. 1. The lower leg 24 of the C contacts the axle 12 from below and is connected, e.g., screwed, to it. The front leg 22 of the C extends from the lower leg 24 approximately vertically toward the top and the upper leg of the C transitions into the rolling surface 28.

On its rear end, the carrier 22 also has a C shape. An upper leg of the C transitions into the rolling surface 28, a vertical leg 26 of the C extends downward, and a lower leg 30 of the C extends forward and comes into contact with the ground when the bale 18 rolls onto the unloading ramp 20. In the unloaded position, the rolling surface 28 extends from the axle 12 toward the rear approximately horizontally.

Figure 2:
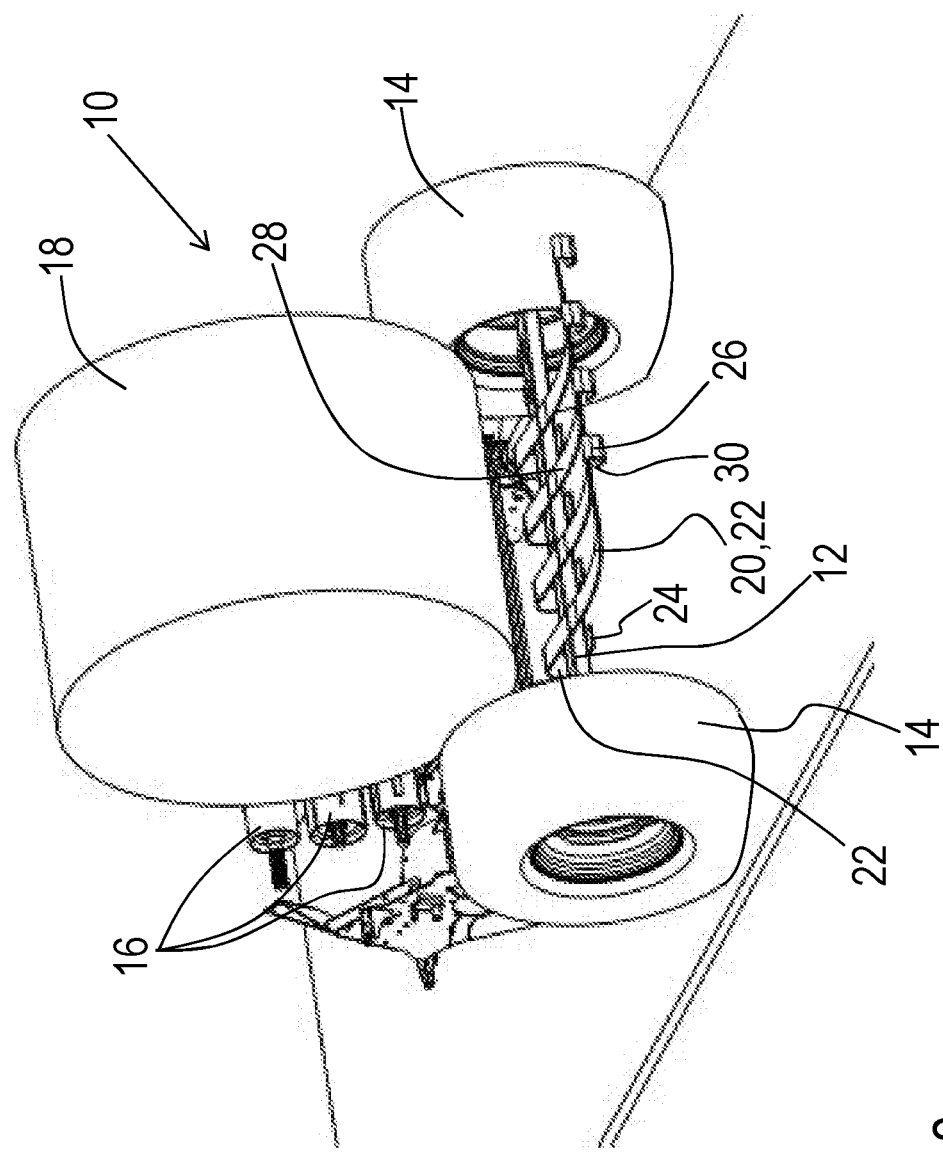

In the embodiment according to FIG. 2, the carrier 22 is built from multiple elements attached laterally one next to the other, otherwise it is identical in structure and function with the embodiment according to FIG. 1. The elements have rectangular cross sections, which, however, could also be square or circular.

FIGS. 3a to 3f show the functioning of the unloading ramp 20 according to FIG. 1 and FIG. 2. The bale 18 formed from the bale-forming chamber is still in the bale-forming chamber in FIG. 3a. The still-unloaded carrier 22 extends approximately horizontally toward the back. If the bale is ejected from the bale-forming chamber, it comes into contact on the carrier 22 (FIG. 3b), which is bent downward by the bale 18, and gradually rolls downward on the flexible, bending carrier 20 (FIGS. 3c to 3e). After the bale 18 has rolled completely off the unloading ramp 20 (FIG. 3f), the unloading ramp 20 springs upward again.

Through the production of the unloading ramp 20 from elastic, flexible material, it can be produced with a relatively lightweight and inexpensive construction. Due to its elasticity, it adapts to the shape of the ground and the bale, which prevents undesired effects on the wrapping material and stresses and fatigue phenomena in the material of the unloading ramp. There is also little risk of damage to the unloading ramp 20, if this should impact against an obstacle while driving in reverse. On the rolling surface 28, a coating made from rubber, steel, plastic, etc. could also be applied on the carrier 20, in order to prevent damage of the wrapping material while the bale 18 is rolling on it.

The invention claimed is:

1. An unloading ramp for a round baler comprising:
   an elongated carrier including a first end having a first C shape with a lower leg configured to fixedly attach to a chassis of the round baler and an upper leg transitioning into a rolling surface for a bale elected from a baling chamber of the round baler;
   the elongated carrier including a second end having a second C shape with a lower leg configured to contact the ground when unloading the bale and an upper leg transitioning into the rolling surface; and
   wherein the elongated carrier extends approximately horizontally in an unloaded position to receive the bale from the baling chamber and bends downwardly to contact the ground in a loaded position to unload the bale from the elongated carrier.

2. The unloading ramp of claim 1, wherein the carrier consists of flexible material or comprises flexible material.

3. The unloading ramp of claim 1, wherein the carrier has a one-piece construction with the first end configured to fixedly attach to the chassis of the round baler.

4. The unloading ramp of claim 1, wherein the carrier comprises several elements that are arranged laterally one next to the other with the first end of each element configured to fixedly attach to the chassis of the round baler.

5. The unloading ramp of claim 2, wherein the flexible material is pre-tensioned upward in the unloaded position.

6. A round baler with an unloading ramp comprising:
   an elongated carrier including a first end having a first C shape with a lower leg fixedly attached to a chassis of the round baler and an upper leg transitioning into a rolling surface for a bale elected from a bailing chamber of the round baler;
   the elongated carrier including a second end having a second C shape with a lower leg contacting the ground when unloading the bale and an upper leg transitioning into the rolling surface; and
   wherein the elongated carrier extends approximately horizontally in an unloaded position to receive the bale from the baling chamber and bends downwardly to contact the ground in a loaded position to unload the bale from the elongated carrier.

7. The round baler of claim 6, wherein the carrier consists of flexible material or comprises flexible material.

8. The round baler of claim 6, wherein the carrier has a one-piece construction with the first end fixedly attached to the chassis of the round baler.

9. The round baler of claim 6, wherein the carrier comprises several elements that are arranged laterally one next to the other with the first end of each element fixedly attached to the chassis of the round baler.

10. The round baler of claim 7, wherein the flexible material is pre-tensioned upward.

11. The unloading ramp of claim 1, wherein the lower leg of the first C shape is configured to fixedly attach to an axle of the round baler.

12. The round baler of claim 6, wherein the lower leg of the first C shape is fixedly attached to an axle of the round baler.

* * * * *